US008915467B2

(12) United States Patent
Narasimha et al.

(10) Patent No.: US 8,915,467 B2
(45) Date of Patent: Dec. 23, 2014

(54) OPTIMAL WING PLANFORMS FOR REDUCING THE INDUCED OR TOTAL DRAG OF THE WING OF AN AIRCRAFT DRIVEN BY WING-MOUNTED TRACTOR PROPELLERS/ROTORS

(75) Inventors: Roddam Narasimha, Bangalore (IN); Suresh Madhusudan Deshpande, Bangalore (IN); Chandrashekarappa Praveen, Bangalore (IN); Belur Raghavan Rakshith, Bangalore (IN)

(73) Assignee: Jawaharlal Nehru Centre for Advanced Scientific Research, Bangalore (IN)

( * ) Notice: Subject to any disclaimer, the term of this patent is extended or adjusted under 35 U.S.C. 154(b) by 189 days.

(21) Appl. No.: 13/381,190

(22) PCT Filed: Jul. 5, 2010

(86) PCT No.: PCT/IN2010/000448
§ 371 (c)(1),
(2), (4) Date: Dec. 28, 2011

(87) PCT Pub. No.: WO2011/021206
PCT Pub. Date: Feb. 24, 2011

(65) Prior Publication Data
US 2012/0104183 A1    May 3, 2012

(30) Foreign Application Priority Data

Jul. 3, 2009    (IN) .......................... 1580/CHE/2009

(51) Int. Cl.
*B64C 39/10*    (2006.01)
*B64C 3/00*    (2006.01)
(52) U.S. Cl.
CPC . *B64C 3/00* (2013.01); *B64C 39/10* (2013.01); *Y02T 50/12* (2013.01)
USPC ..................................... 244/35 R; 244/45 R

(58) Field of Classification Search
USPC .............. 244/34 R, 45 R, 46, 35 R, 200, 215; D12/341, 344
See application file for complete search history.

(56) References Cited

U.S. PATENT DOCUMENTS

D120,187 S  *  4/1940  Silverstein ................... D12/335
D123,595 S  *  11/1940 Fruits ........................... D12/333
(Continued)

OTHER PUBLICATIONS

Veldhuis, L.L.M. et al., 'A Simple Wing Optimization Code Including Propeller Effects', 21st Congress of International Council of the Aeronautical Sciences, Sep. 13-18, 1998, Paper ICAS-98-2.3.4.
Veldhuis, L.L.M., 'Optimization of Tractor Propeller/Wing Configurations', Proceedings of the Institute of Mechanical Engineers, Part G: Journal of Aerospace Engineering 1989-1996, vol. 209, No. G3, pp. 215-226, 1995.
International Search Report of the ISA (mailed Feb. 7, 2011) and Written Opinion of the IPEA (mailed Jul. 6, 2011) for PCT/IN2010/000448.

*Primary Examiner* — Timothy D Collins
*Assistant Examiner* — Jamie S Stehle
(74) *Attorney, Agent, or Firm* — Harness, Dickey & Pierce, PLC

(57) ABSTRACT

The disclosure relates to Aeronautics, more particularly relating to wing planforms that reduce wing drag substantially in aircraft driven by propellers or other rotors in tractor configuration. An aircraft comprising a wing and propeller system (1), said system comprising wing planform (2) characterized into wing chord regions (3) behind each propeller/rotor (5) whose length is relatively varied with respect to length of wing chord regions (4) at outboard of the propeller/rotor (5) towards wing tip and/or at inboard of the propeller (5) towards fuselage, and plurality of propellers (5) fixed ahead of wing leading edge such that induced drag is reduced by exploiting the velocity field generated by the slipstream of the propeller (5). Also, provides for a method of optimizing wing and propeller system and a method reducing induced drag, among other possible parameters of interest.

5 Claims, 11 Drawing Sheets

(56) References Cited

U.S. PATENT DOCUMENTS

Figure 1:
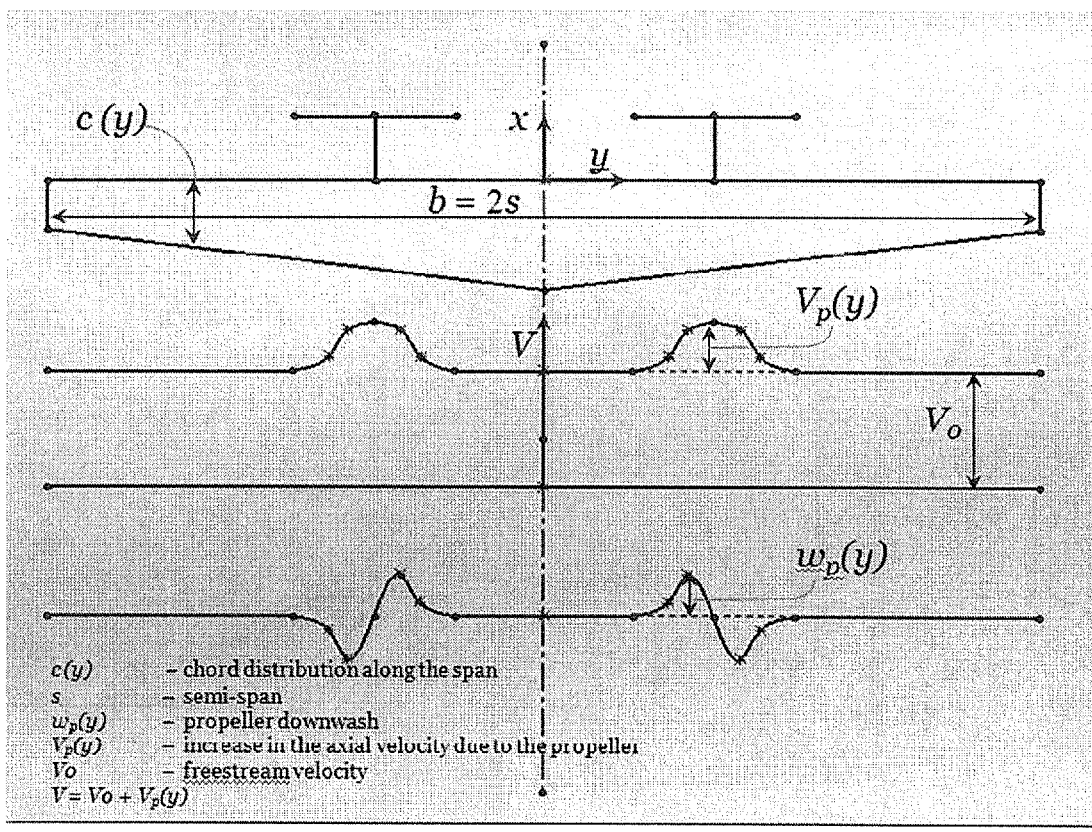

| | | | |
|---|---|---|---|
| 3,166,271 A * | 1/1965 | Zuck | 244/7 C |
| 3,350,036 A * | 10/1967 | Lemoigne | 244/35 R |
| 3,627,235 A * | 12/1971 | Lippisch | 244/12.1 |
| 5,909,858 A * | 6/1999 | Hawley | 244/36 |
| 7,455,264 B2 * | 11/2008 | Wakayama | 244/215 |
| 2006/0060721 A1 * | 3/2006 | Watts et al. | 244/200 |
| 2009/0152405 A1 | 6/2009 | Kelm | |

\* cited by examiner

Pressure Surface

Pressure surface

Pressure Surface

OPTIMAL WING PLANFORMS FOR REDUCING THE INDUCED OR TOTAL DRAG OF THE WING OF AN AIRCRAFT DRIVEN BY WING-MOUNTED TRACTOR PROPELLERS/ROTORS

CROSS-REFERENCE TO RELATED APPLICATIONS

This application is a 371 U.S. National Stage of International Application No. PCT/IN2010/000448, filed Jul. 5, 2010, and claims priority to Indian patent application No. 01580/CHE/2009 filed Jul. 3, 2009, the disclosures of which are herein incorporated by reference in their entirety.

TECHNICAL FIELD

The disclosure relates to Aeronautics, more particularly relating to planforms that reduce wing drag substantially in aircraft driven by propellers or other rotors in tractor configuration.

BACKGROUND

The disclosure relates to the wing design for aircrafts driven by propellers or other rotors in tractor configuration and a method for reducing the induced drag and the total drag and/or any other such aerodynamic parameters of interest that is affected as a result of at least one propeller slipstream flowing onto a wing.

In a propeller-driven aircraft there is an aerodynamic interaction between the propeller slipstream and the wing. This is of great significance in particular if the propeller(s) is/are situated in front of the wing, for example a turboprop aircraft in tractor configuration. During operation propellers not only produce a thrust but also accelerates and imparts a swirl to the flow downstream of the propeller. This results in a propeller air flow (hereinafter also referred to as a "propeller slipstream") that impinges in a helical or spiral shape on the wing surface that is situated behind it. Depending on the direction of rotation of the respective propeller there is an increase or reduction in the local angle of attack on the wing. Consequently there is a corresponding deformation of the lift distribution on the wing as a result of which, other things being the same, there is an increase in the induced drag of the wing.

Since the early 1990's there has been a decline in the usage of turboprops because of availability of cheap oil. At that time jets were preferred as they were affordable, faster and quieter. However, owing to climate change concerns and connectivity demands, turboprops are now once again becoming more attractive. Hence, there is a need to explore new technologies associated with turboprops and other rotor driven aircraft and optimize them for better performance.

The existing technologies currently associated with propeller-driven aircraft do not take adequate account of the potential to exploit the effects of the propeller slipstream to design a better wing. Improving aerodynamic efficiency has become increasingly important in recent years due to uncertain fuel prices and concerns about climate change. This is because, the propeller and rotor-driven aircraft in particular turboprops, are inherently more energy efficient than turbojets.

The disclosure addresses the problems due to the propeller slipstream by extending lifting line theory to include propeller effects and coupling it to an optimizer, which generates novel wing designs which offer better aerodynamic performance such as lower drag by optimizing the chord distributions for prescribed twist distributions or other constraints.

STATEMENT OF THE DISCLOSURE

The present disclosure provides for a wing and propeller system (1), said system comprising wing planform (2) characterized into wing chord regions (3) behind each propeller/rotor (5) whose length is relatively varied with respect to length of wing chord regions (4) at outboard of the propeller/rotor (5) towards wing tip and/or at inboard of the propeller (5) towards fuselage, and plurality of propellers (5) fixed ahead of wing leading edge (6) such that induced drag is reduced by exploiting the velocity field generated by the slipstream of the propeller (5), also provides for an aircraft comprising a wing and propeller system (1), said system comprising wing planform (2) characterized into wing chord regions (3) behind propeller/rotor (5) whose length is relatively varied with respect to length of wing chord regions (4) at outboard of the propeller/rotor (5) towards wing tip and/or at inboard of the propeller (5) towards fuselage, and plurality of propellers (5) fixed ahead of wing leading edge (6) such that induced drag is reduced by exploiting the velocity field generated by the slipstream of the propeller (5), also provides for a method of optimizing a wing and propeller system (1), said method comprising act of inputting one or more prescribed parameter values of wing and propeller into respective computing modules for generating optimized wing and propeller system (1), and also provides for a method for reducing induced drag of an aircraft, said method comprising act of characterizing chord regions (3 and 4) of wing and propeller system (1) along span to optimize load distribution.

BRIEF DESCRIPTION OF THE ACCOMPANYING DRAWINGS

The features of the present disclosure will become more fully apparent from the following description and appended claims, taken in conjunction with the accompanying drawings. Understanding that these drawings depict only a few embodiments in accordance with the disclosure and are, therefore, not to be considered limiting of its scope, the disclosure will be described with additional specificity and detail through use of the accompanying drawings.

Figure 2A:
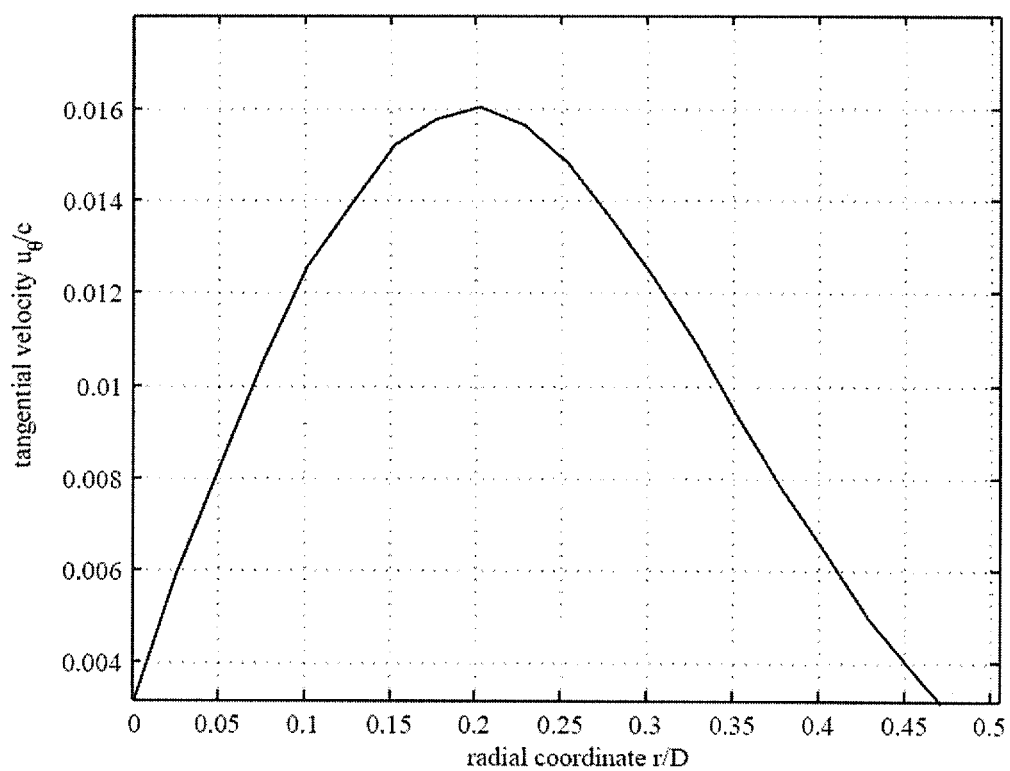
Figure 2B:
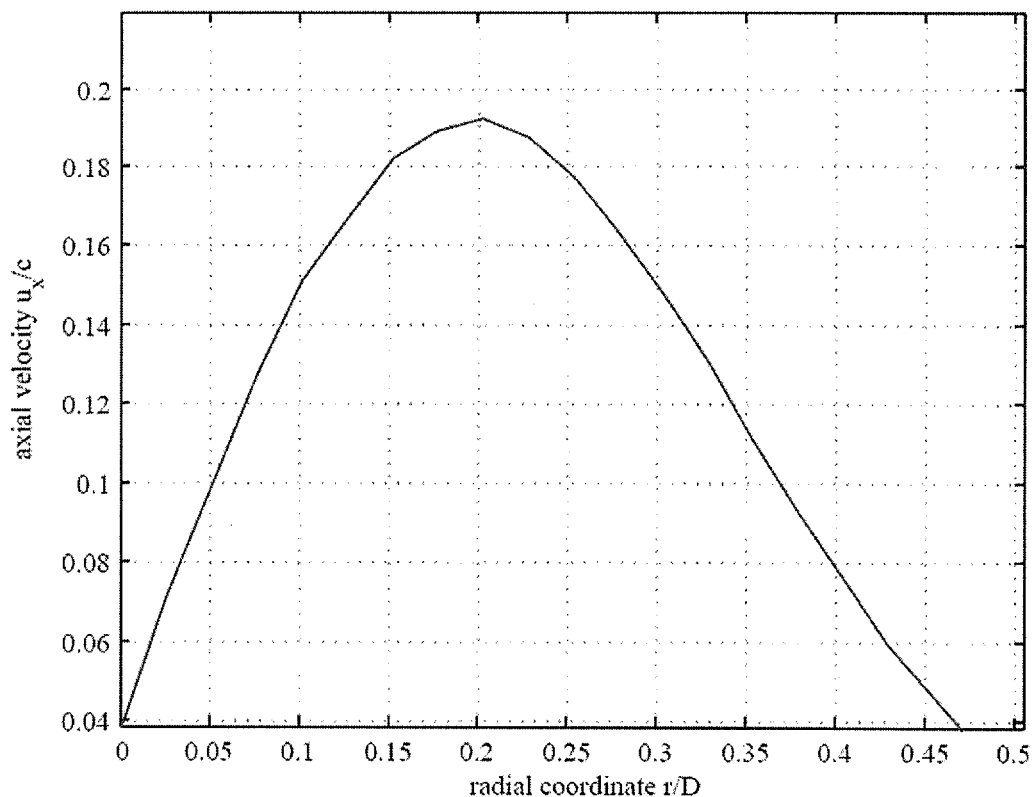
Figure 3:
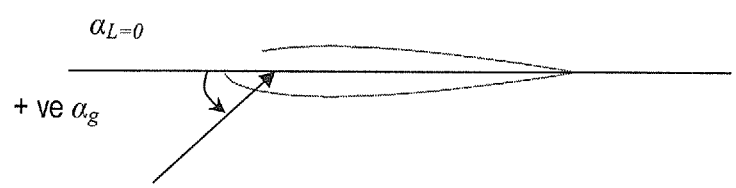
Figure 4:
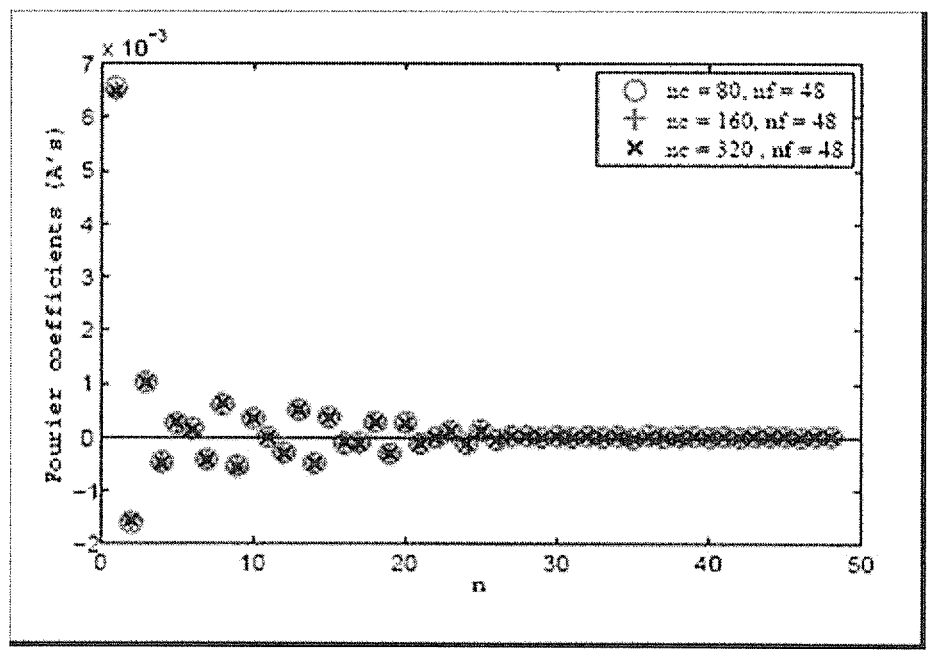
Figure 5:
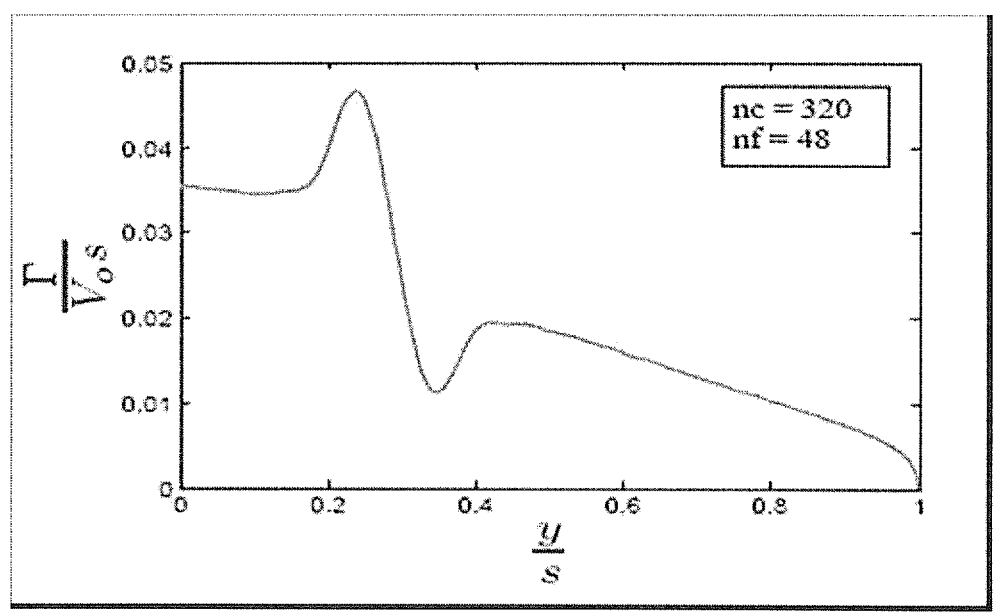
Figure 6A:
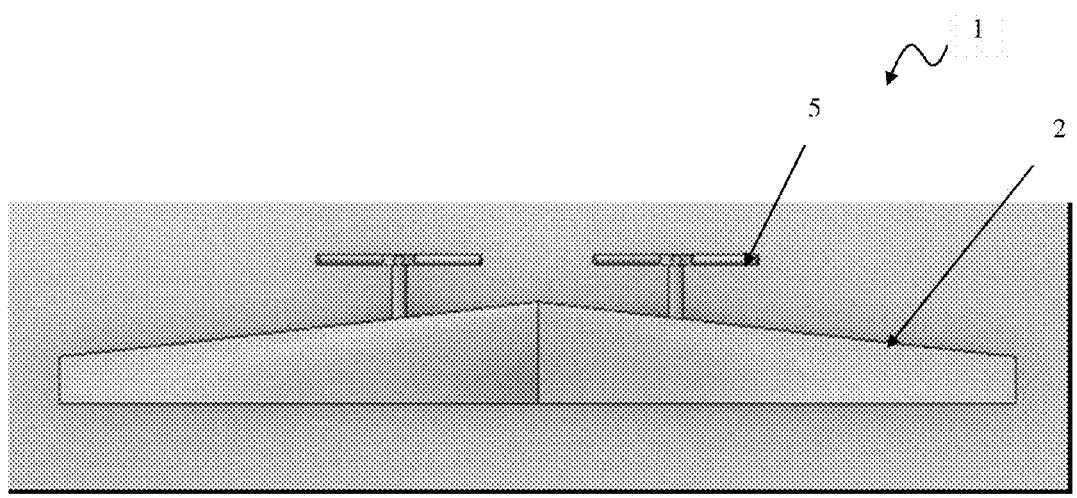
Figure 6B:
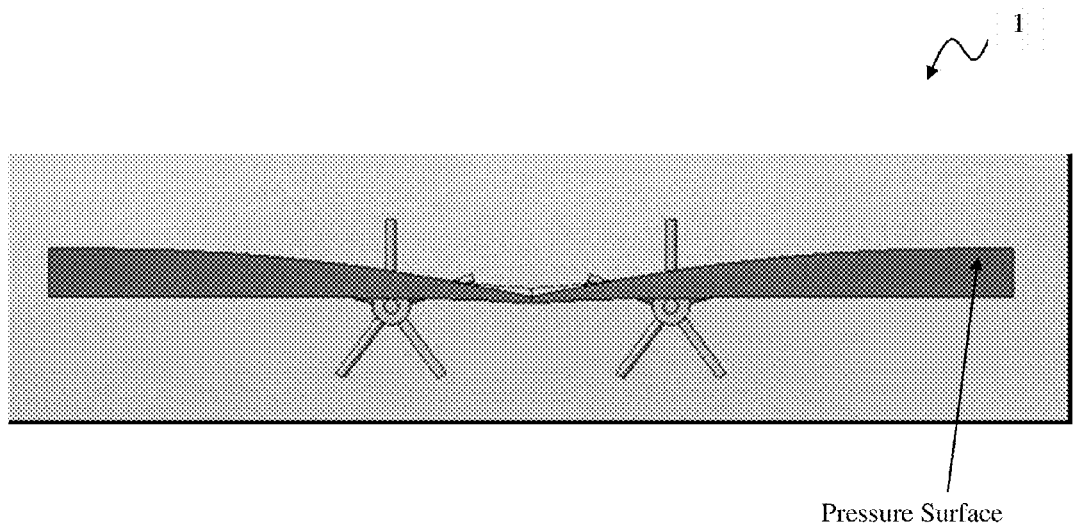
Figure 7A:
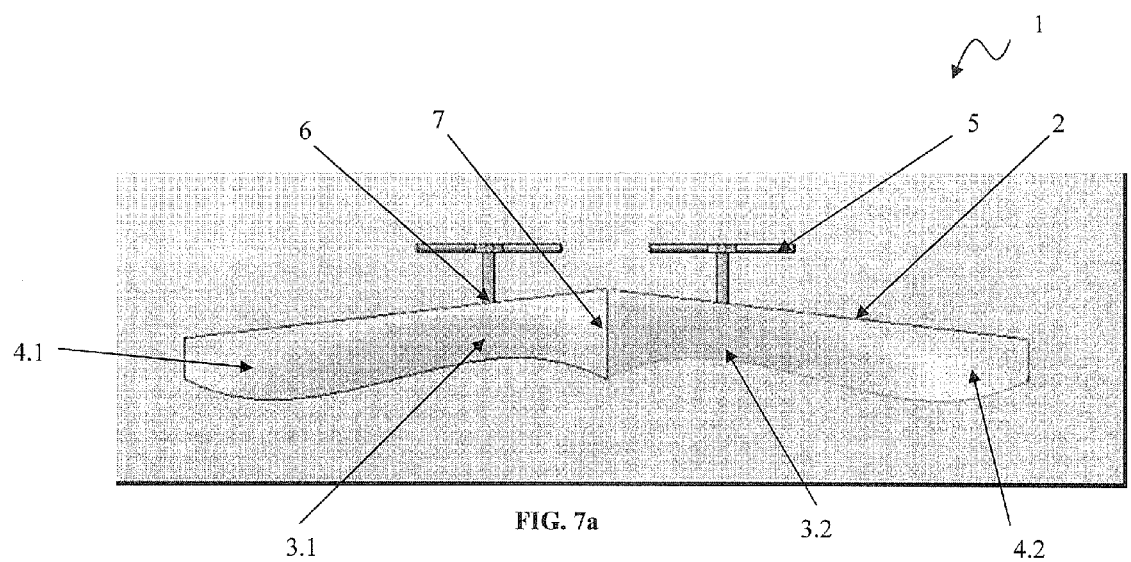
Figure 7B:
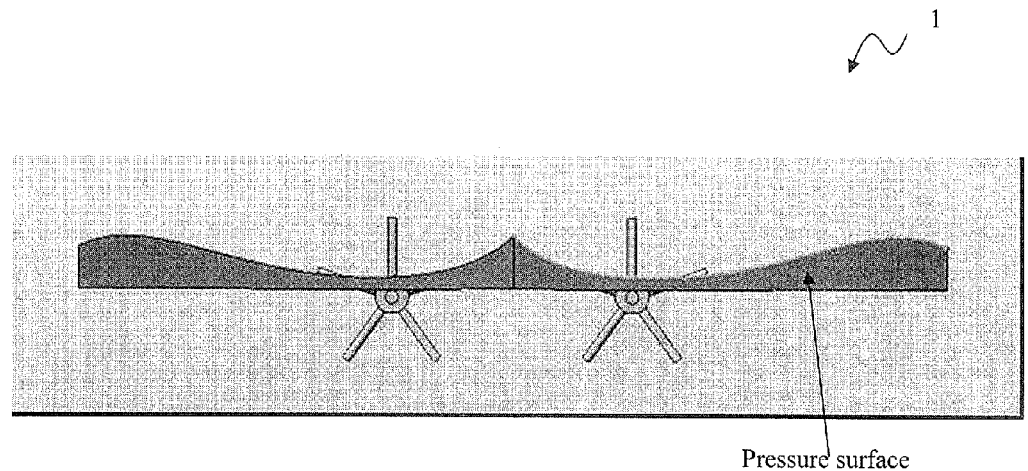
Figure 7C:
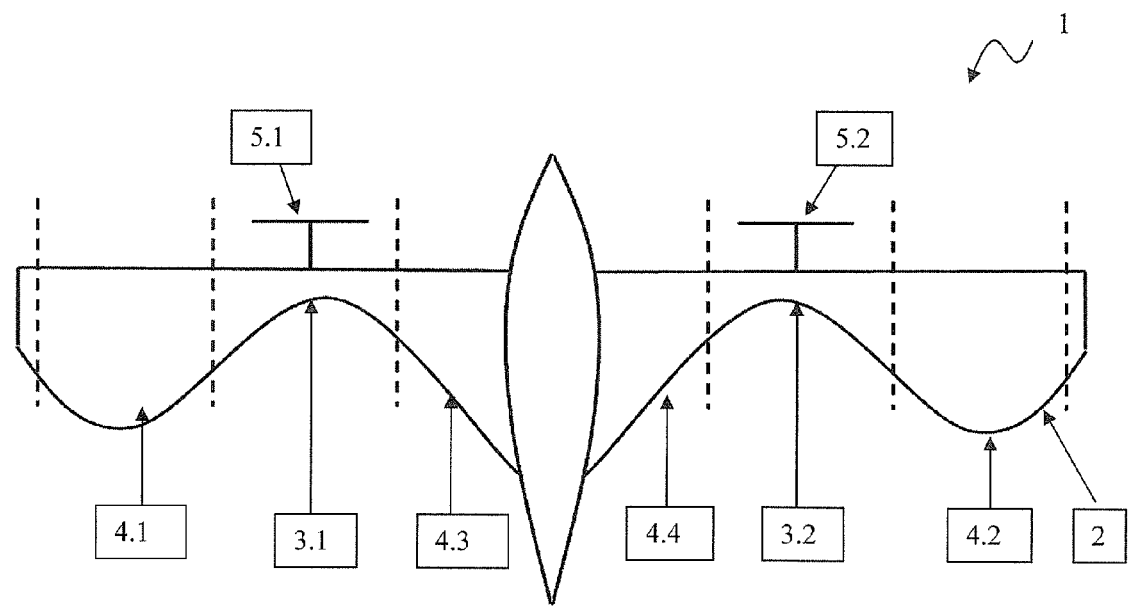
Figure 7D:
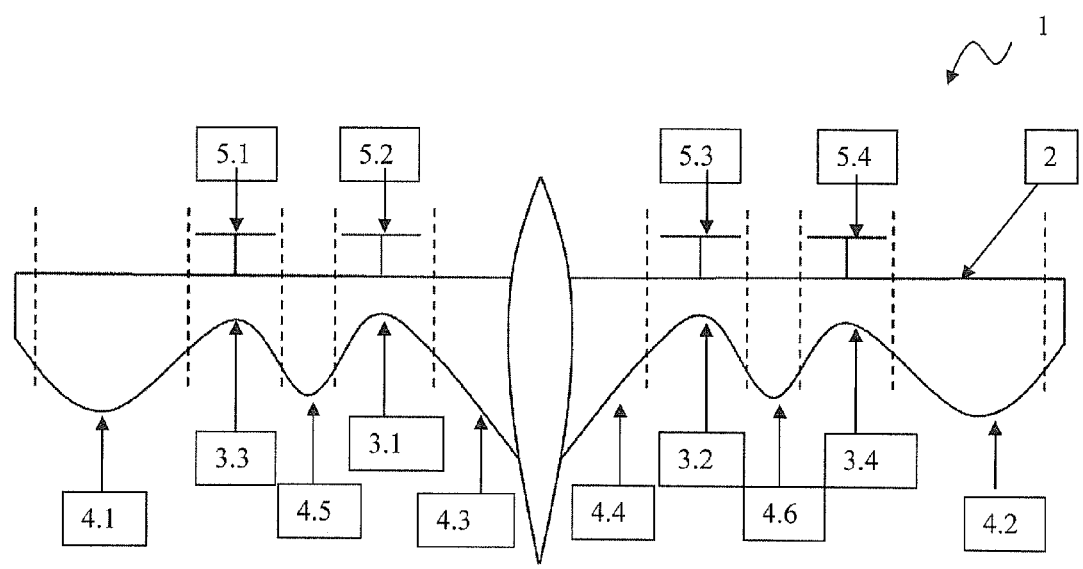
Figure 8:
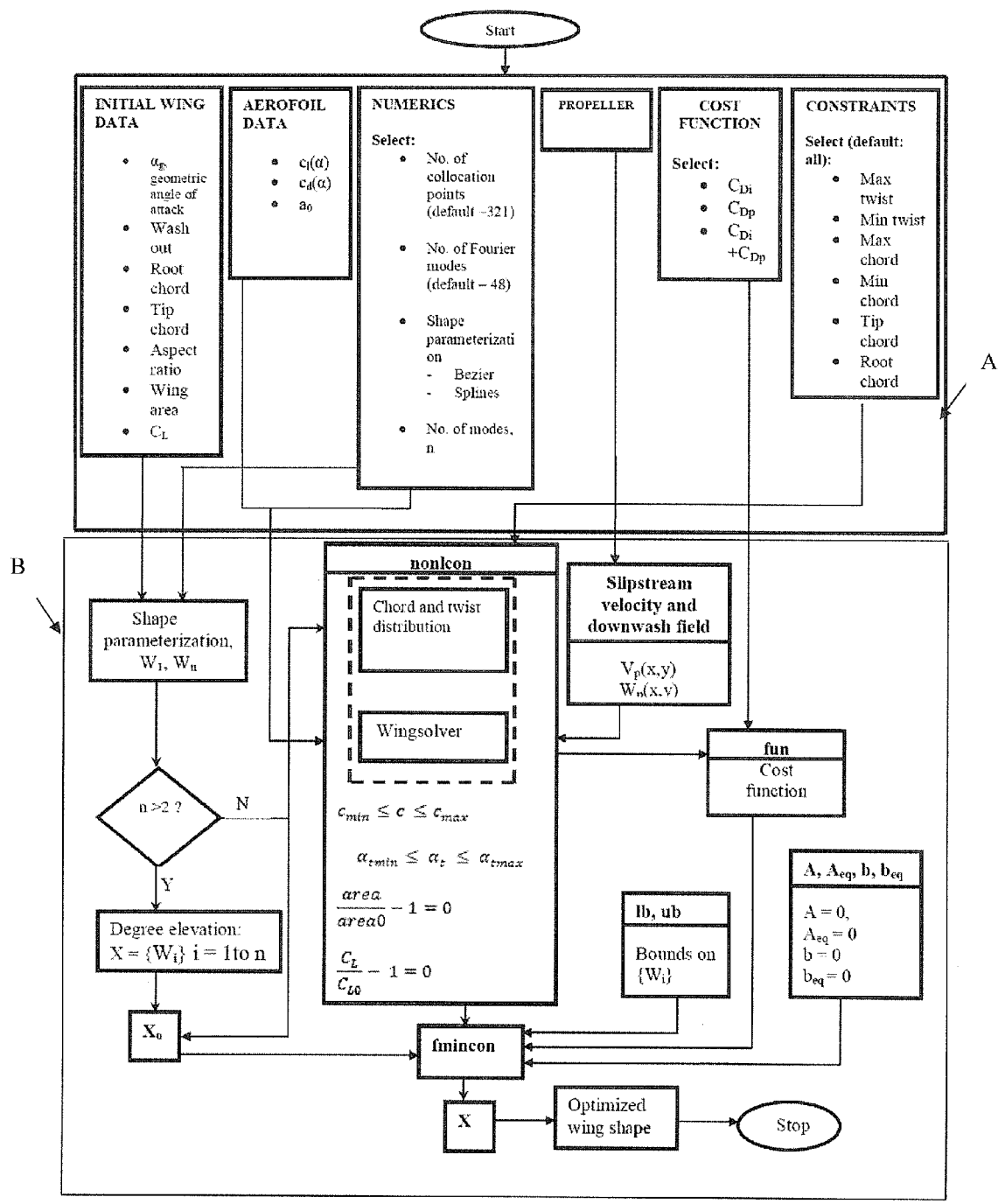
Figure 9A:
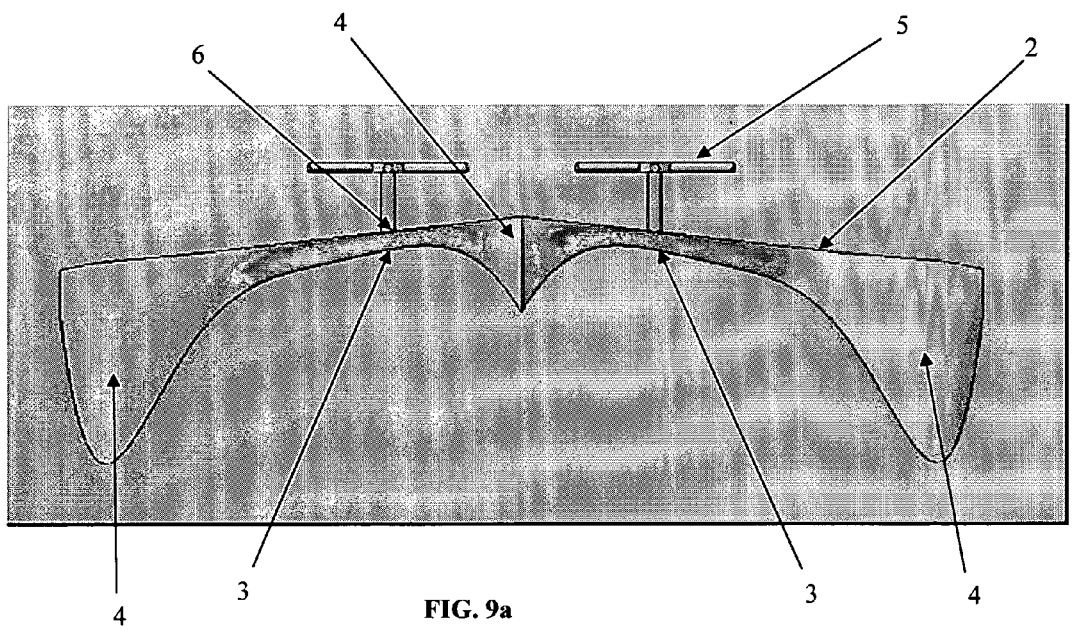
Figure 9B:
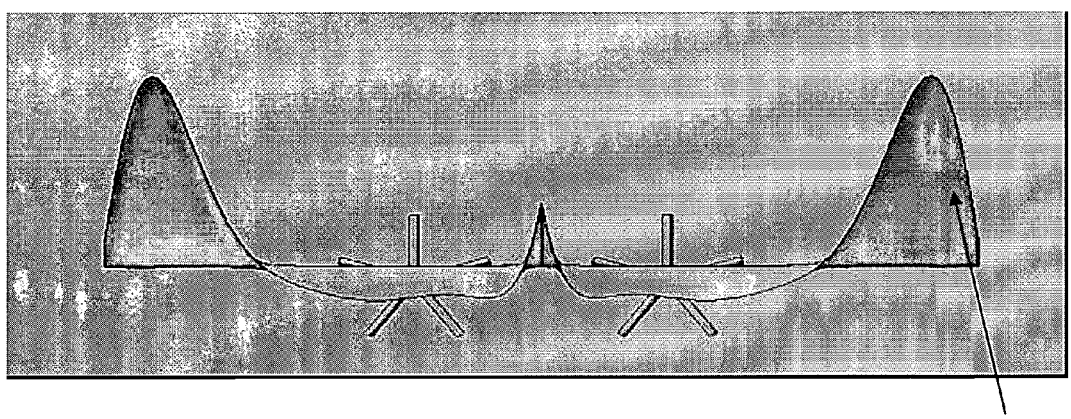
Figure 10:
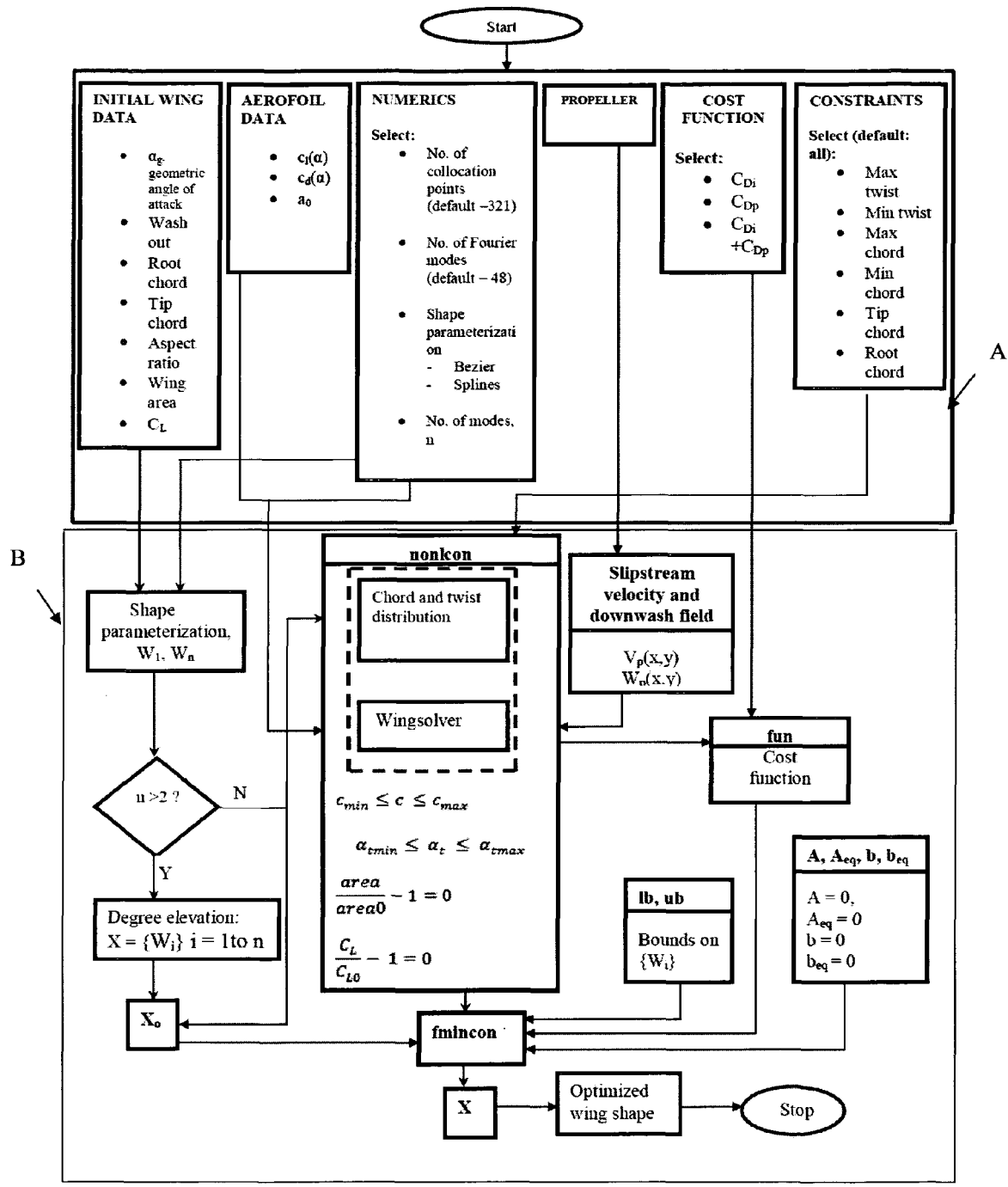

FIG. 1 shows schematic representation of a wing in tractor-propeller configuration, FIG. 2a shows schematic variation of tangential velocity along the propeller blade, FIG. 2b shows schematic axial velocity along the propeller blade, FIG. 3 shows aerofoil, illustrating angles taken positive counter clockwise from angle of zero lift, FIG. 4 shows plot of variation of Fourier modes with collocation points, FIG. 5 shows plot of circulation for a reference wing-propeller configuration, FIG. 6a shows top view of typical wing planform illustrating chord distribution according to prior art, FIG. 6b shows rear view of typical wing planform looking from the trailing edge of the aircraft according to prior art, FIG. 7a shows top view of one embodiment of wing planform illustrating chord distribution according to present disclosure, FIG. 7b shows rear view of one embodiment of wing planform looking from the trailing edge of the aircraft according to present disclosure, FIG. 7c shows schematic of wing and propeller system for a twin-propeller configuration showing different chord regions according to the present disclosure;

FIG. 7d shows schematic of wing and propeller system for a 4-propeller configuration showing different chord regions according to the present disclosure;

FIG. 8a shows top view of another embodiment of wing planform illustrating chord distribution according to present disclosure, FIG. 8b shows rear view of another embodiment of wing planform looking from the trailing edge of the aircraft according to present disclosure, FIG. 9a shows top view of yet another embodiment of wing planform illustrating chord distribution according to present disclosure, FIG. 9b shows rear view of yet another embodiment of wing planform looking from the trailing edge of the aircraft according to present disclosure, FIG. 10 shows flow chart required for the optimization process to generate various wing planforms according to present disclosure.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, and designed in a wide variety of different configurations, all of which are explicitly contemplated and make part of this disclosure.

This disclosure is drawn, inter-alia, to wing and propeller system, methods of optimizing wing and propeller system and reducing induced and total drag and/or any other such aerodynamic parameters of interest that are affected by the slipstream.

REFERRAL NUMERALS

1: wing and propeller system
2: wing planform
3 and 4: wing chord regions
5: propeller
6: wing leading edge The principal embodiment of the disclosure provides a wing and propeller system (1), said system comprising wing planform (2) characterized into wing chord regions (3) behind each propeller/rotor (5) whose length is relatively varied with respect to length of wing chord regions (4) at outboard of the propeller/rotor (5) towards wing tip and/or at inboard of the propeller (5) towards fuselage, and plurality of propellers (5) fixed ahead of wing leading edge (6) such that induced drag is reduced by exploiting the velocity field generated by the slipstream of the propeller (5).

In yet another embodiment of the disclosure the projected variation in length of chord regions (3) just behind the propeller (5) and length of chord regions (4) is in proportion of about 0.28.

In yet another embodiment of the disclosure the wing and propeller system (1), said system comprising wing planform (2) characterized into wing chord regions (3) behind each propeller/rotor (5) whose length is relatively varied with respect to length of wing chord regions (4) at outboard of the propeller/rotor (5) towards wing tip and/or at inboard of the propeller (5) towards fuselage, and in between two propellers/rotors (5) if there are more than one on each side fixed ahead of wing leading edge (6) such that induced drag is reduced by exploiting the velocity field generated by the slipstream of the propeller (5).

In yet another embodiment of the disclosure the wing and planform system (1) reduces induced drag of about 30% and total drag reduction of about 13%.

In yet another embodiment of the disclosure the wing planform (2) has a projected variation in twist from about −2° to about 3°

Another main embodiment of the disclosure is an aircraft comprising a wing and propeller system (1), said system comprising wing planform (2) characterized into wing chord regions (3) behind each propeller/rotor (5) whose length is relatively varied with respect to length of wing chord regions (4) at outboard of the propeller/rotor (5) towards wing tip and/or at inboard of the propeller (5) towards fuselage, and plurality of propellers (5) fixed ahead of wing leading edge (6) such that induced drag is reduced by exploiting the velocity field generated by the slipstream of the propeller (5).

Another main embodiment of the disclosure provides for a method of optimizing a wing and propeller system (1), said method comprising act of inputting one or more parameter values of wing and propeller into respective computing modules for generating optimized wing and propeller system (1).

In yet another embodiment of the disclosure provides for an aircraft comprising a wing and propeller system (1), said system comprising wing planform (2) characterized into wing chord regions (3) behind each propeller/rotor (5) whose length is relatively varied with respect to length of wing chord regions (4) at outboard of the propeller/rotor (5) towards wing tip and/or at inboard of the propeller (5) towards fuselage, and in between two propellers/rotors (5) if there are more than one on each side fixed ahead of wing leading edge (6) such that induced drag is reduced by exploiting the velocity field generated by the slipstream of the propeller (5).

In yet another embodiment of the disclosure the parameter values of wing and propeller comprise initial wing data, aerofoil data, numerics data, propeller data, cost function and constraints.

In yet another embodiment of the disclosure the initial wing data comprise wing geometry consisting of root chord, tip chord, twist distribution, aspect ratio, wing planform area and lift coefficient.

In yet another embodiment of the disclosure the cost function value comprises lift induced drag and/or parasite drag.

In yet another embodiment of the disclosure the constraints comprise root tip chord, tip chord, wing planform area, lift coefficient, bounds on twist and chord.

In yet another embodiment of the disclosure the computing modules of fmincon of matlab provides such as shape parameterization, Nonlcon, slipstream velocity, downwash field and FUN.

Another main embodiment of the disclosure provides a method for reducing induced drag of an aircraft, said method comprising act of characterizing chord regions (3 and 4) of wing and propeller system (1) along span to optimize load distribution.

In yet another embodiment of the disclosure said wing planform (2) characterized into wing chord regions (3) behind propeller/rotor (5) whose length is relatively varied with respect to length of wing chord regions (4) at outboard of the propeller/rotor (5) towards wing tip and/or at inboard of the propeller (5) towards fuselage.

In yet another embodiment of the disclosure the wing planform optionally has prescribed twist distributions configured along the span to optimize lift distribution. The word 'propeller' includes any open propulsive system using blades including the open rotor systems, mounted on, upstream or downstream of the wings of an aircraft. The word 'slipstream' will similarly refer to the velocity field induced by and associated with any such propeller. Due to the propeller, the region of the wing exposed to the propeller slipstream experiences higher velocities. Therefore, there is an increase in the lift at any given angle of attack. Lifting line theory provides that induced drag at a given lift will be at its minimum when the load distribution along the span is elliptic. Other things being the same, the region of the wing immersed in the propeller slipstream experiences a higher load because of the higher velocities and there is a departure of the load distribution along the span form the optimum. The drag at a given lift is minimized by shaping the wing planform suitably in combination with other means of reducing drag, e.g. an appropriate twist distribution along the wing. To take into account the propeller slipstream effects, an extension of the lifting line theory has been developed. Using this theory an optimization technique has also been developed to obtain optimal wing designs for lower drag. The inputs for the calculating the wing design are wing data such as wing area, aspect ratio, root chord, tip chord, twist distribution, angle of attack and slipstream data. The slipstream data is computed using software called prowing. The outputs of the technique is an optimal chord and optionally twist distribution for the wing design, which results in minimum drag subject to the specified constraints.

An apparatus and method are provided for generating families of wings with novel planforms or wing designs or profiles that reduces the drag of the wing on an aircraft driven by propellers or other rotors in the tractor configuration. The wings exploit the slipstream due to the presence of propeller or rotor to reduce the drag coefficient by appropriately shaping the wing planform, which optionally be combined with such other devices as winglets, wing twist distribution etc along the span. Using the optimization technique of prowing on the basis of an extended lifting line theory, and an optimization method using the weights of Bezier polynomials (Ref [1]), cubic splines and other similar mathematical bases as control parameters, optimal chord distributions, in combination with any twist distribution as considered necessary, the wing planforms are generated by the described method resulting in minimum drag coefficient for specified constraints. Such constraints include but are not limited to total lift coefficient, wing planform area, and upper and lower bounds on chord, tip and root chord and optionally wing twist. The prowing include an optimizer code for computation for designing wing planforms.

The class of wing planforms have been obtained, for use in propeller-driven aircraft characterized generally by lower wing chords behind each propeller and higher wing chords elsewhere including one or more of the following areas: outboard of the propeller, towards the wing tip, inboard of the propeller, towards the fuselage, and between propellers if there is more than one on each side of the wing, with smoothly curved leading and/or trailing edges, so determined as to reduce the drag of the wing by exploiting the velocity field generated by the slipstream of the propeller.

The wing planform disclosed works for all aircraft powered by propellers especially in the tractor arrangement and other rotor-propulsive units (e.g. open rotor systems).

The method of designing the wing planform includes an extended lifting line theory to account for propeller slipstream effects and an optimization routine using the weights of Bezier polynomials as control parameters. The wing designs are generated using prowing and yield lower induced and total drag subject to aerodynamic constraints such as given total lift and geometric constraints such as given root chord, tip chord, wing area and bounds on wing twist.

FIG. 1 shows a schematic of a wing in a tractor-propeller configuration. The wing has a semi-span of 's' and a chord distribution c(y) where y is the spanwise coordinate. Part of the wing immersed in the propeller slipstream experiences an increase in the axial velocity V(y) and an additional downwash $w_p(y)$ along with the downwash due to the trailing vortices of the wing $w_w(y)$.

FIGS. 2a and 2b illustrates schematic variation of tangential velocity along the propeller blade and schematic axial velocity along the propeller blade respectively.

In order to account for the propeller slipstream effects, an extended lifting line theory was developed.

The mathematical formulation is as follows:
Given:

$$V(y)=V_0+V_p(y) \quad (1)$$

$$w_p(y) \quad (2)$$

where $V_p(y)$ and $w_p(y)$ are the time-averaged axial velocity and downwash respectively and $V_0$ is the free stream velocity.

The total downwash w(y) is the sum of the downwash due to the wing and the propeller. If $\Gamma(y')$ is the circulation at y' and y is the location at which the total downwash is needed, then $$w(y) = w_w(y) + w_p(y) \quad (3)$$

$$= \frac{1}{4\pi}\int_{-s}^{+s} \frac{1}{y-y'} \frac{d\Gamma}{dy'} dy' + w_p(y) \quad (4)$$

The effective angle of attack which the aerofoil section sees is given by $$\alpha_e(y) = \alpha(y) - \frac{w_w(y)+w_p(y)}{V(y)} \quad (5)$$

where $\alpha(y)=\alpha_g-\alpha_t(y)$, $\alpha_g$ is the geometric angle of attack and $\alpha_t(y)$ is the twist along the span measured from the angle of zero lift as indicated in FIG. 3.

The lift and induced drag are given respectively by $$L=\int_{-s}^{+s}\rho V(y)\Gamma(y)dy \quad (6)$$

$$D_i=\int_{-s}^{+s}\rho w(y)\Gamma(y)dy \quad (7)$$

Transforming the coordinate system from y to θ by putting y=−s cos θ and expanding Γ in Fourier series [2] with $A_k$ as the Fourier coefficients, then $$\Gamma = 4sV_o\sum_{k=1}^{\infty} A_k \sin k\theta \quad (8)$$

The fundamental equations to determine downwash, the Fourier coefficients, lift and induced drag will respectively transform into the following set:

$$w(y) = v_o \frac{\sum_{k=1}^{\infty} kA_k \sin k\theta}{\sin\theta} + w_p(y) \quad (9)$$

$$\left(\sum_{k=1}^{\infty} A_k \sin k\theta\right)(k\mu + \sin\theta) = \mu \frac{V(\theta)}{V_o}\sin\theta\left(\alpha - \frac{w_p(\theta)}{V(\theta)}\right); \mu = \frac{a_o c}{8s} \quad (10)$$

$$L = 4\rho V_o s^2 \int_0^\pi V(\theta)\sin\theta \sum_{k=1}^\infty A_k \sin k\theta \, d\theta \quad (11)$$

$$D_i = 2\pi s^2 \rho V_o^2 \sum_{k=1}^\infty kA_k^2 + A_k B_k \quad (12)$$

where $$B_k = \frac{2}{\pi}\int_0^\pi \frac{w_p(y)}{V_o}\sin k\theta \sin\theta \quad (13)$$

The lifting line equation is solved to determine the Fourier coefficients by the method of collocation using a least squares approach.

Let $n_c$ and $n_f (<n_c)$ be the number of collocation points along the span and number of Fourier coefficients respectively. For validation $n_c=16$, $n_f=8$, For wing-propeller configuration $n_c=320$, $n_f=48$. If LL=0 as the lifting line equation, then the least squares formulation is as follows:

$$LL(\theta, A_1 \ldots A_{nf}) = \left(\sum_{k=1}^{n_f} A_k \sin k\theta\right)(k\mu + \sin\theta) - \mu\left(\frac{v(\theta)}{v_o}\right)\sin\theta\left(\alpha - \frac{w_p}{v(\theta)}\right) = 0 \quad (14)$$

$$\frac{\partial}{\partial A_j}\sum_{i=1}^{n_c} [LL(\theta_i, A_1 \ldots A_{nf})]^2 = 0; j = 1 \ldots n_f \quad (15)$$

The code was validated against Glauert's [2] results on monoplane coefficients varying with taper ratio for a wing alone case.

In order to determine the number of Fourier modes and collocation points for wing-propeller configuration, a convergence study was conducted. From FIG. 4, it can be seen that 48 Fourier modes and 320 collocation points are sufficient to determine the circulation distribution along the span for a reference wing with a taper of 0.45 wing and a 3° linear washout with a propeller as a propulsive unit. FIG. 5 shows the circulation distribution for the reference wing-propeller configuration.

FIG. 6a illustrates top view of typical wing planform illustrating chord distribution according to prior art. FIG. 6b illustrates rear view of typical wing planform looking from the trailing edge of the aircraft according to prior art. The wing aspect ratio is about 12 and the lift coefficient ($C_L$) is about 0.27. The pressure surfaces are located at outboards of the wing planforms.

EXAMPLE

FIG. 7a illustrates top view of one embodiment of wing planform illustrating chord distribution according to present disclosure and FIG. 7b illustrates rear view of one embodiment of wing planform looking from the trailing edge of the aircraft according to present disclosure. The FIGS. 7a and 7b is an example of the optimized wing design obtained for a wing with a straight leading edge, a taper of 0.45 and a 3° linear washout. The constraints included $C_L=0.27$, wing area, root chord, tip chord and bounds on twist ($-14° \leq \alpha_t \leq 14°$). The optimized wing gives an induced drag reduction of 19.3% and a total drag reduction of 8.74%.

FIG. 8a illustrates top view of another embodiment of wing planform illustrating chord distribution according to present disclosure. FIG. 8b illustrates rear view of another embodiment of wing planform looking from the trailing edge of the aircraft according to present disclosure. The wing aspect ratio is about 12, the lifting coefficient ($C_L$) is about 0.27, average chord/2<c<2*average chord, the twist distribution $\alpha_t$ is ranging from $-14°$ to $14°$, there are 8 Bezier modes for chord and 4 Bezier modes for twist. The induced drag ($\Delta C_{Di}$) is about $-29.45\%$, the profile drag ($\Delta C_{Dp}$) is about $-1.9\%$ and the total drag ($\Delta C_D$) is about $-12.75\%$.

FIG. 9a illustrates top view of yet another embodiment of wing planform illustrating chord distribution according to present disclosure. FIG. 9b illustrates rear view of yet another embodiment of wing planform looking from the trailing edge of the aircraft according to present disclosure. The wing aspect ratio is about 12, the lifting coefficient ($C_L$) is about 0.27, the twist distribution $\alpha_t$ is ranging from $-14°$ to $14°$, there are 10 Bezier modes for chord and 4 Bezier modes for twist. The induced drag ($\Delta C_{Di}$) is about $-45.74\%$, the profile drag ($\Delta C_{Dp}$) is about $0.91\%$ and the total drag ($\Delta C_D$) is about $-17.47\%$.

The optimized wing presented above uses the following values as the input data:
Semispan 's'=1
Root chord 'cm'=0.21156
Tip chord 'ct': 0.0952
Washout=3°
Aspect Ratio=12
Wing planform area=0.3068
Aerofoil: NACA 63-215
No. of collocation points: 321
No. of Fourier modes: 48
Shape parameterization: Bezier polynomials
Number of modes: Mentioned at the top of the page for each optimized shape presented in this report.
Propeller: Diameter=2.64 m, Advance ratio=0.2, Number of blades=5
Cost function=$C_D$; $C_{Dp}$
Constraints: root chord, tip chord, wing planform area, $C_L$, Bounds on twist and chord.

FIG. 10 illustrates flow chart required for the optimization exercise to generate various wing shapes according to present disclosure. The flow chart mainly consists of two blocks A & B. Block A describes the input and block B describes the modules required for the optimization exercise to generate various wing shapes that have lesser drag for wings on an aircraft driven by propellers or other rotors in the tractor configuration.

Following are the inputs that have to be specified in block A.
  i. Initial wing data: This module describes the wing geometry by taking in inputs such as root chord, tip chord, twist distribution, aspect ration, wing planform area, design lift coefficient $C_L$.
  ii. Aerofoil data: This module describes the type of aerofoil used by taking in the values of lift coefficient and drag coefficient.
  iii. Numerics: Since the equations are being solved numerically certain inputs to discretise the equations such as collocation points, number of Fourier modes. To ensure that the optimized shapes are smooth, a choice of the parameterization technique must be made.

iv. Propellers: This module describes the time averaged velocity as experienced by the wing.

v. Cost function: This is a certain objective function for which the optimizer generates shapes such that the objective function is either minimum or maximum. The objective functions are lift induced drag ($C_{Di}$) or parasite drag ($C_{Dp}$) or the sum of $C_{Di}$ and $C_{Dp}$ or any other combination of aerodynamic parameters of interest.

vi. Constraints: The feasibility is realized by optimum shapes using certain constraints. Some of the constraints are root chord, tip chord, wing planform area, design $C_L$, bounds on twist and chord. Many other constraints are also specified depending on the problem of interest.

The Box B contains modules that interact with the optimizer fmincon of matlab to generate optimal wing shapes. These modules include the following:

i. Shape parameterization: Based on the choice made in block A the wing is represented as a polynomial and the weights of the polynomial are supplied as design variables to fmincon.

ii. Nonlcon: This module ensures that the specified constraints are satisfied. This module solves for the Fourier coefficients using equation 10 and computes the value of lift coefficient using equation 11.

iii. Slipstream velocity and downwash field: This provides the information of the variation of velocities along the span of the wing which will be used to calculate various parameters in the problem.

iv. Fun: This module computes the value of the cost function and based on the value the optimizer drives the solution to the optimum.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

References:

[1] Gerald Farin, "Curves and Surfaces for CAGD", Morgan Kaufmann, California, 2002.

[2] Glauert, "The Elements of aerofoil and airscrew theory", Cambridge University Press, 1926.

We claim:

1. A wing and propeller/rotor system, for reducing the induced or total drag of a wing in a tractor configuration, with at least one propeller/rotor mounted ahead of the wing, said system further consisting of:

a wing planform having a continuous leading edge and/or a continuous trailing edge, said leading and trailing edges defining a varying chord length along the span of the wing, said wing planform further comprising:

a concave portion with shorter wing chords in a slip stream region behind each propeller/rotor, and convex portions with longer wing chords, when compared with said shorter wing chords, located respectively on either side of the said shorter wing chords in both outboard and inboard regions adjacent to each propeller/rotor.

2. A method for reducing the induced or total drag of a wing in a tractor configuration, with a plurality of propellers/rotors mounted ahead of the wing, said method consisting of an act of characterizing a wing planform, having a continuous leading edge and/or a continuous trailing edge, by varying chord length along the span of the wing, said wing planform including:

a concave portion with shorter wing chords in a slipstream region behind each propeller/rotor and convex portions with longer wing chords, when compared with said shorter wing chords, located respectively on either side of the said shorter wing chords in both an outboard region and an inboard region adjacent to each propeller/rotor on each wing.

3. An aircraft comprising a wing and propeller/rotor system as claimed in claim 1.

4. The wing and propeller/rotor system of claim 1, wherein the leading edge is substantially linear and the trailing edge is substantially arcuate.

5. The wing and propeller/rotor system of claim 1, wherein an axis of rotation of at least one propeller/rotor intersects the shorter wing chords.

\* \* \* \* \*